Feb. 9, 1971  TOMOKUNI MITSUISHI ET AL  3,562,188
CRITICAL TEMPERATURE RESISTOR DEVICES CONTAINING VANADIUM
OXIDE AS A PRINCIPAL CONSTITUENT AND METHOD
FOR PREPARING THE SAME
Filed May 15, 1968                5 Sheets-Sheet 1
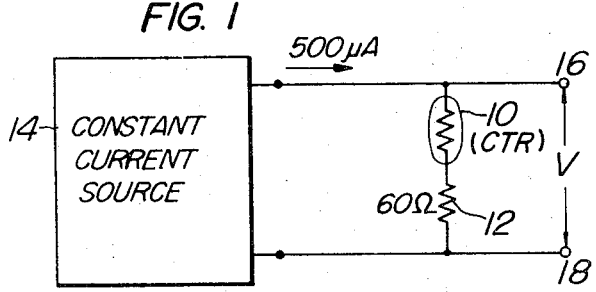
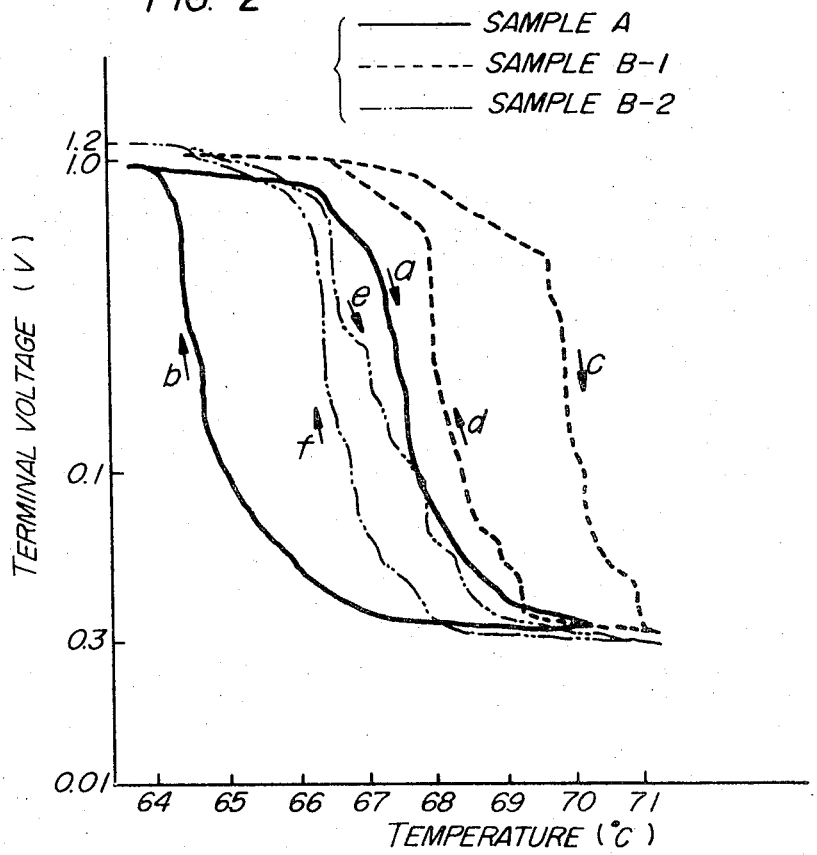
INVENTORS
TOMOKUNI MITSUISHI
SEIKICHI AKIYAMA
SAKICHI ASHIDA
HISAO FUTAKI
BY
Craig & Antonelli
ATTORNEYS

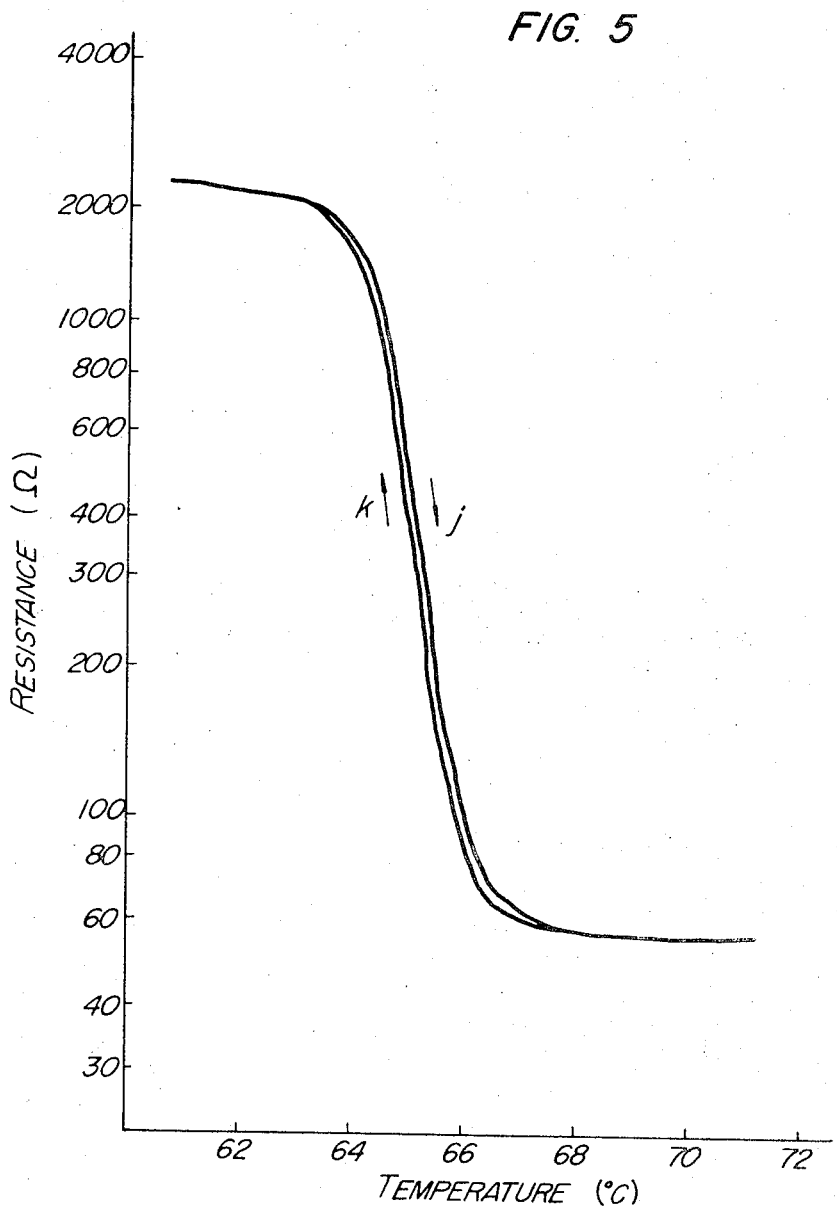

United States Patent Office 3,562,188
Patented Feb. 9, 1971

3,562,188
CRITICAL TEMPERATURE RESISTOR DEVICES CONTAINING VANADIUM OXIDE AS A PRINCIPAL CONSTITUENT AND METHOD FOR PREPARING THE SAME
Tomokuni Mitsuishi, Kodaira-shi, Seikichi Akiyama, Kokubunji-shi, Sakichi Ashida, Fuchu-shi, and Hisao Futaki, Musashino-shi, Japan, assignors to Hitachi, Ltd., Tokyo, Japan, a corporation of Japan
Filed May 15, 1968, Ser. No. 729,288
Claims priority, application Japan, May 17, 1967, 42/30,814
Int. Cl. H01b 1/06
U.S. Cl. 252—518    9 Claims

ABSTRACT OF THE DISCLOSURE

A critical temperature resistor device contains vanadium oxide as a main constituent and the vanadium oxide consists of fine crystalline particles of $VO_2$ whose crystal sizes are arranged in a range not exceeding $50\mu$ to improve a hysteresis phenomenon.

---

This invention relates to an oxide semi-conductor whose resistance changes suddenly at a specific temperature and a method for preparing the same.

Titanium oxide and vanadium oxide are mentioned as an oxide semi-conductor having such a characteristic of suddenly-changing resistance, but the present invention relates, particularly, to a critical temperature resistor device composed of vanadium oxide as a principal constituent, which is heretofore referred to as "C.T.R. device" in the present specification. Such a C.T.R. device is mainly comprised of vanadium oxide crystals. Among various kinds of vanadium oxide crystals, the resistance of some kinds of the crystals changes suddenly in the order of about 3 to 4 figures at an ambient temperature of about 70° C., and thus the usefulness of such crystals has been recently highly evaluated as a detecting element of fire alarm or detecting elements of various temperature-controlling instruments.

As typical vanadium oxide crystals having such characteristics of suddenly-changing resistance, there are VO, $V_2O_3$ and $VO_2$, but the critical temperature of VO and $V_2O_3$ where the resistances change suddenly, that is, the resistance suddenly-changing temperature, is about $-100°$ C. and thus VO and $V_2O_3$ are not useful in general. Therefore, only $VO_2$ is industrially useful for the abovementioned C.T.R. device because the resistance suddenly-changing temperature is about 70° C., as compared with other vanadium oxides as mentioned above. In general, $VO_2$, may exist in the form of $V_2O_4$, but its unit molecule is $VO_2$ consisting of one vanadium atom and two oxygen atoms. Thus, in the present specification, the desired vanadium oxide is represented as $VO_2$ but it should be understood that $VO_2$ includes $V_2O_4$.

British patent specification No. 1,040,072 discloses a typical prior art C.T.R. device, and a product based on said prior art has been already commercially available under a trademark of "Critesistor." Such Critesistor is prepared, as described in said patent specification, by mixing $V_2O_5$ with at least one member selected from the group consisting of other basic and acidic oxides, and reducing and sintering the thus prepared mixture.

However, as a result of various experiments, the present inventors have found that the so-called hysteresis phenomenon, that is, a difference in resistance suddenly-changing temperature, develops between the case where the C.T.R. device prepared according to said prior art disclosed in said British patent specification is heated from the normal temperature to an elevated temperature and the case where the device is cooled from the elevated temperature to the normal temperature inversely, and that there are a number of devices exhibiting a hysteresis phenomenon, that is, the difference in the resistance suddenly-changing temperature of 2° to 5° C., among said C.T.R. devices. When a C.T.R. device having a relatively remarkable hysteresis phenomenon is used as a detecting element of fire alarm or as a detecting element of temperature control instrument, there is a fear of instabilization in the functioning of the apparatus or failure in the precise temperature control.

Furthermore, according to the prior art method as disclosed in said patent specification, the characteristic of the element is sensibly influenced by the kind and quantity of basic or acidic oxide to be added to $V_2O_5$ or by the reduction conditions of $V_2O_5$. Accordingly, it is sometimes difficult to prepare C.T.R. devices having a constant characteristic as to the degree of resistance change at a specific temperature or a temperature range from the start to the stabilization of resistance change.

In applying the C.T.R. device, the devices having a small hysteresis and constant characteristic are required.

The object of the present invention is to provide improved critical temperature resistor devices containing vanadium as a principal constituent and a method for preparing the same.

Another object of the present invention is to provide critical temperature resistor devices containing vanadium oxide as a principal constituent and having an improved hysteresis characteristic and a method for preparing the same.

Another object of the present invention is to provide resistor devices consisting mainly of vanadium oxide which has an improved hysteresis characteristic and a constant resistance-temperature characteristic, and a method for preparing the same.

According to the present invention, the critical temperature resistor devices consist mainly of crystal particles of vanadium oxide, the particle sizes of said vanadium oxide crystals being arranged in a range not exceeding $50\mu$ (microns).

According to one embodiment of the present invention, such critical temperature resistor devices are prepared by pulverizing $VO_2$ crystals into fine crystalline powders of $VO_2$ having sizes not exceeding $50\mu$ and sintering said fine crystalline powders. According to other embodiment of the present invention, the critical temperature resistor devices are prepared by adding to said fine crystalline powders of $VO_2$ having sizes not exceeding $50\mu$ at least one oxide selected from the group consisting of SrO, $Co_2O_3$, $GeO_2$, BaO, CaO, PbO, and $Nb_2O_5$ and sintering the thus obtained mixture.

FIG. 1 shows a scheme of circuit for measuring characteristics of C.T.R. devices.

FIG. 2 shows a graph for illustrating the hysteresis phenomenon of C.T.R. devices.

FIG. 5 shows a graph for illustrating the temperature-resistance characteristic and hysteresis phenomenon of a C.T.R. device according to the present invention.

Figure 3:
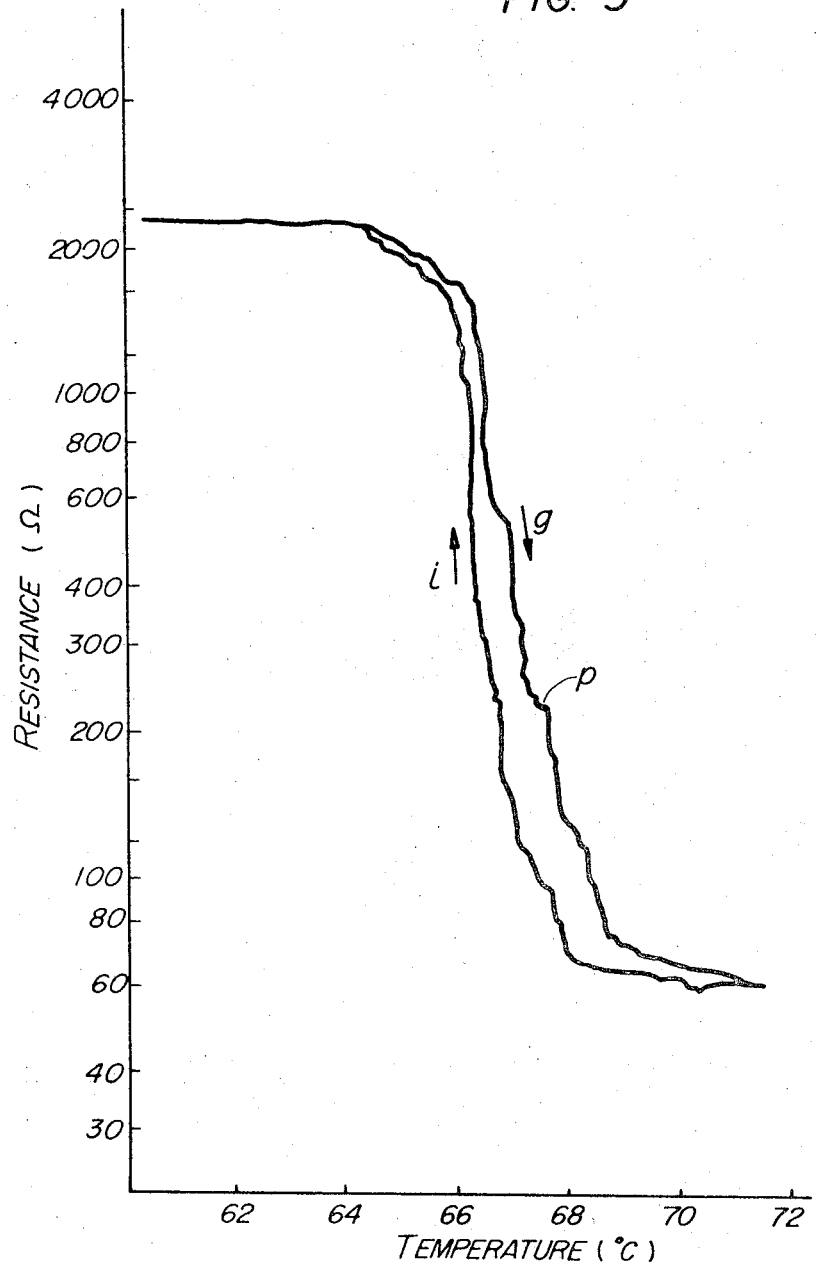
FIG. 3 shows a graph for illustrating a temperature-resistance characteristic and hysteresis phenomenon of C.T.R. device.

Referring to FIGS. 1, 2 and 3, the hysteresis phenomenon of the C.T.R. device is hereunder explained.

When the temperature of C.T.R. device gradually increases from the normal temperature and reaches a certain specific temperature, the resistance suddenly decreases and then the decreased resistance undergoes no remarkable change even by further heating. On the other hand, when the temperature of C.T.R. device is reduced from the elevated temperature where the resistance is stable at a low value and reaches a certain specific temperature, the resistance suddenly increases, and the increased resistance undergoes no remarkable change even if the temperature is further reduced to the normal temperature. When the change in the resistance when increasing the temperature is compared with the change in the resistance when reducing the temperature the temperatures at which the resistance changes is not the same when the temperature is increased as when the temperature is decreased. Such phenomenon is called "hysteresis phenomenon."

The hysteresis phenomenon is determined by a measuring apparatus as shown in FIG. 1. A resistance 12 of 60Ω is connected in series to a C.T.R. device 10 to be determined, and current 500 μa. is supplied to said series circuit from a constant current source 14. A voltage V between the terminals 16 and 18 of the series circuit is measured while changing the ambient temperature of the C.T.R. device. The thus determined result is shown in FIG. 2. In said figure, the axis of ordinates represents a terminal voltage (volt) and the axis of abscissas a temperature (° C.). As samples A and B the $VO_2$ crystals containing $Al_2O_3$ as an impurity and having dimensions of about 1.5 x 1.0 x 0.5 mm., which are prepared according to the experiment as described in the successive sections of the present specification, are used, and the terminal voltage is measured while increasing the temperature at a rate of 0.2° to 0.4° C./min. (downward arrow marks a, c and e) and reducing the temperature at the same rate (upward arrow marks b, d and f). Sample B-2 is a substantially same sample as Sample B-1, and is prepared for the second measurement of the hysteresis after the measurement of the first hysteresis is completed. As is obvious from FIG. 2, the temperature-resistance characteristic of the same sample differs in the case of increasing temperature from in the case of decreasing temperature, and even in the same sample, the characteristic in the case of increasing temperature or in the case of decreasing temperature differs at the first measurement from at the second measurement.

FIG. 3 shows a result of the resistance-temperature characteristic measurement of the sample B-2 having a relatively small hysteresis phenomenon, but is is seen that there is a difference by about 1° C. in the resistance suddenly-changing temperature between the case of increasing temperature and the case of decreasing temperature. In FIG. 3, the axis of ordinates represents an overall resistance in the series circuit consisting of the C.T.R. device and 60Ω resistor as shown in FIG. 1.

Such hysteresis phenomenon is practically very inconvenient, and is evidently most troublesome in commercializing the C.T.R. devices.

As stated above, the present invention is to eliminate said hysteresis trouble and provide a C.T.R. device having good characteristics and an improved method for preparing the same.

The present invention is hereunder explained in detail.

The present invention has been accomplished on the basis of the findings according to the following experiment conducted by the present inventors, and first of all the experiment and the thus obtained result are explained below:

The experiment was conducted to find out the causes for the hysteresis phenomenon and thus was directed to observation of phase transition phenomenon of $VO_2$ crystals. As to the $VO_2$ phase transition, it is considered that the $VO_2$ crystals changes from the semiconductor structure at a low temperature to the metallic structure at an elevated temperature, and such a peculiar characteristic that the resistance suddenly changes at a specific temperature is thereby brought about.

The present inventors experimentally observed such a transition phenomenon and, as a result, found out the following facts. Parts of pictures of the transition phenomena observed by the present inventors are given in FIGS. 6a and 6b.

The foregoing observation was made in the following experiment.

To obtain $VO_2$ monocrystals, $V_2O_5$ placed in a platinum vessel was melted in a furnace kept at a specific temperature and the $VO_2$ monocrystals were prepared by passing a specific amount of reducing gas over the molten $V_2O_5$ for a specific period of time. The thus prepared samples and the conditions for preparing the respective samples are shown in Table 1. $V_2O_5$ used in the experiment had a very high purity and contained maximum 20 p.p.m. of Al, maximum 2 p.p.m. of Si and maximum 1 p.p.m. of Mg as impurities.

TABLE 1

| Sample No. | Raw material, g. | | Reducing gas, l./min. | Temperature, ° C. | Time, day | Analytical value of element due to additive in sample, wt. percent |
|---|---|---|---|---|---|---|
| | $V_2O_5$ | Additive | | | | |
| 1 | 54 | | $N_2$:0.05-1, Ar:0.2 | 1,100 | 8 | |
| 2 | 30 | $Nb_2O_5$:0.154 | $N_2$:0.05-2 | 1,100 | 8 | 0.44 |
| 3 | 30 | $Fe_2O_3$:0.077 | $N_2$:0.05-2 | 1,100 | 14 | 0.08 |
| 4 | 30 | $GeO_2$:0.17 | $N_2$:0.05=2 | 1,100 | 8 | 0.18 |
| 5 | 30 | $Cr_2O_3$:0.056 | $N_2$:0.4 | 1,100 | 8 | 0.04 |
| 6 | 30 | $Al_2O_3$:0.045 | $N_2$:0.2, Ar:0.1 | 1,100 | 8 | 0.05 |

The thus obtained crystals were in a block state, and were dipped into an aqueous solution of sodium carbonate at 60° C. for 40 hours together with the vessel to remove the unreacted substances. When only crystals were taken out, the crystals were disintegrated to a large number of crystal flakes having volumes of a few cubic millimeters. Among these crystal flakes, a monocrystal flake having a flat cleavage plane was picked up and embedded into a transparent resin so that one plane may be exposed for the observation of change in the crystal state. Further, both end surfaces were polished to make the crystal be exposed, and provided with silver electrodes using indium as a brazing material. The silver electrodes were used as electrode terminals.

Figure 6A:
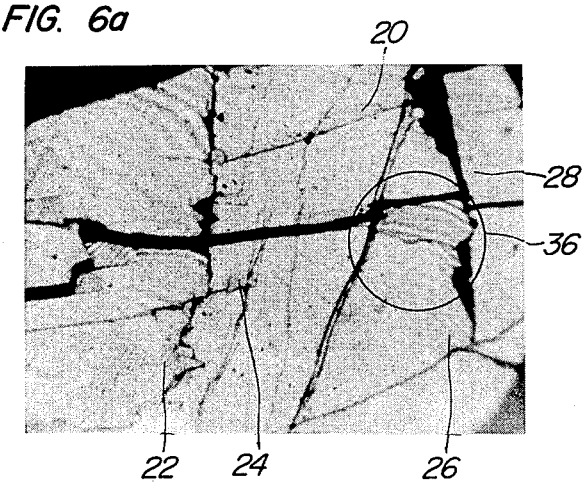
FIGS. 6a and 6b show miscroscopic pictures for illustrating the state of $VO_2$ monocrystal in phase transition due to the ambient temperature.
Figure 6B:
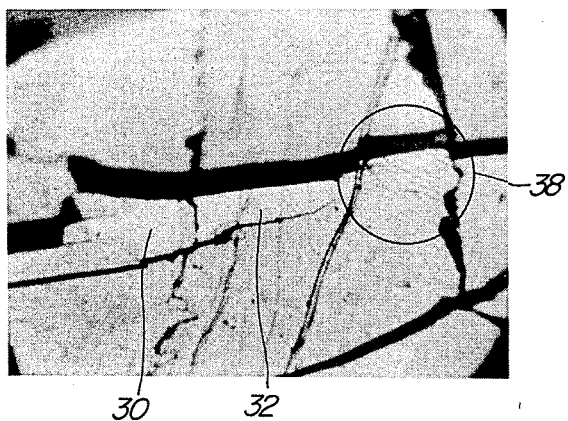

In that manner, the samples were prepared and then by heating and cooling the sample, changes in the state of vanadium oxide crystal due to the temperature change were observed. FIGS. 6a and 6b show the changes in the states of crystals when these samples are heated and cooled. That is, FIG. 6a is the microscopic picture showing the state of crystals at a resistance suddenly-changing temperature when the sample is heated, and FIG. 6b the microscopic picture showing the state of crystals at a resistance suddenly-changing temperature when the sample is cooled. The portions indicated by the arrows 20, 22, 24, 26 and 28 in FIG. 6a are the elevated temperature phases in blue and other portions are the low temperature phases in yellowish color. In FIG. 6a the most crystals have not undergone the phase transition yet. In FIG. 6b the portions indicated by the arrows 30 and 32 are the low temperature phases. These portions have been already changed into the low temperature phases. The most remarkable difference between these two figures is that the sizes of cracks formed in the lateral direction are different between FIGS. 6a and 6b and further that the sizes of cracks formed in longitudinal and inclined directions are also different between FIGS. 6a and 6b. These differences in the size of crack are due to the distortion developed when the crystals change from the low temperature phase to the elevated temperature phase. Further explanation is made hereunder as to this point.

As stated above, the pictures, FIGS. 6a and 6b, show the processes when the crystals undergo the phase transition. The present inventors took pictures of these phase transition continuously by a 16 mm. movie film and observed this phase transition phenomenon in detail. As a result, the following facts were confirmed.

(1) The phase transition proceeds in the direction of $Cr$ axis, that is, the C axis in the elevated temperature phase lattice, but when there is a crack in the proceeding direction, the transition is interrupted to take place. This fact is understandable from FIGS. 6a and 6b where the area of the elevated temperature phase in FIG. 6a, and the area of the low temperature phase in FIG. 6b are almost surrounded by the cracks respectively. Further, as shown in FIG. 3, the interruption of the phase transition is clearly indicated on the temperature-resistance curve. In FIG. 3, the point P shows the interruption of the phase transition due to the crack, and the interruption of change in the resistance is observed at the point P.

(2) When the transition is repeated, the cracks grow or newly form due to the deformation of crystals brought about by the transition. The $VO_2$ crystals have a monoclinic crystal structure in the low temperature phase and a tetragonal rutile type crystal structure in the elevated temperature phase, and the phase transition from the low temperature phase to the elevated temperature phase or from the elevated temperature phase to the low temperature phase brings about such a deformation of crystal structure. Such cracks bring about an interruption of the transition as described in (1). The growth and development of such cracks are readily understandable from FIGS. 6a and 6b.

(3) When the cracks further develop and the disintegration of the crystals take place, the small particles formed by said disintegration have different transition speeds from those before the disintegration and thus a great change in the temperature-resistance characteristic is brought about.

It is readily understandable from the above-mentioned facts that such disadvantages as non-uniformity in the characteristic, poor hysteresis, non-stability in the characteristic, etc. are due to various phenomena as described above, which are brought about by the distortion when the phase transition takes place. Accordingly, in order to remove the above-mentioned disadvantages, it was found that the influence of the distortion must be eliminated from the phase transition. Whether the distortion due to said crystal transformation could be dealt with as a common problem among the respective samples as disclosed in said Table 1 or not was studied, but it was found that there was some difference among the respective samples. Such difference was found to be due to the fact that the magnitudes of the distortions are not equal to one another among these samples. The reason why the magnitudes of such distortions are different among these samples are that there is a new phase different from said elevated temperature phase and low temperature phase. Said new phase is, as described in detail below, called "an intermediate phase." Thus, the present invention is based on our finding of a new fact that there is a new phase, which has not been heretofore known, in the process of phase transition. The new phase is formed at an intermediate between the elevated temperature phase and the low temperature phase and thus is called "the intermediate phase," as described above. The $VO_2$ crystals, in which said intermediate phase exists, readily undergo great distortion; in other words, in such $VO_2$ crystals, cracks tend to develop. As to said intermediate phase, one of the present inventors, Tomakuni Mitsuishi disclosed it in detail under the title of "On the phase transformation of $VO_2$" in Japanese Journal of Applied Physics, vol. 6, No. 9, pp. 1060–1071 (September 1967).

Now, the nature of such intermediate phase is explained below:

Electrical resistance in the intermediate phase state is not different from that in the low temperature phase state; NMR (nuclear magnetic resonance) in the intermediate phase state is similar to that in the low temperature phase state, and this phenomenon is due to the fact that an ion pair of V—V forms a covalent bond; local structure around the vanadium ion is similar to that of the low temperature phase, but is clearly different from the structure of the low temperature phase. Further, it is more characteristic that the intermediate phase disappears when the entire $VO_2$ crystal is changed into the elevated temperature phase or low temperature phase, and the intermediate phase is only formed and exists at the intermediate of the phase transition.

The crystal structure of such intermediate phase belongs to a triclinic system and undergoes great transformation when the crystal is subjected to phase transition from the low temperature phase or elevated temperature phase. Occurence of such intermediate phase brings about a great distortion in the crystal, as stated above. Said distorted parts are observed as a stripe-pattern at portions 36 and 38 enclosed by a circle in FIGS. 6a and 6b. Said stripe-pattern is an interference fringe, and the occurrence of such interference infringe shows that the intermediate phase has a corrugated surface structure (a twinning structure). A crack tends to develop at the tops or bottoms of such corrugated form. Such corrugation is a twinning structure formed to relieve the accumulation of distortion due to the phase transition. That is, it seems that when the accumulation of distortion due to the phase transition reaches a limit, the twinning is developed and the corrugation is formed.

As a result, the surface comes to have a crystal structure having many bendings and is observed as a stripe-pattern. In such a structure having many bendings, cracks develop at the tops or bottoms of the corrugation, as stated above, and thus finally bring about instability in the characteristic, poor hysteresis, or the like, as stated above.

In order to remove said disadvantages, it was found on the basis of the above-mentioned findings that the following two conditions are to be satisfied:

(1) A C.T.R. device consisting of substance almost incapable of forming an intermediate phase should be prepared, and (2) An influence of distortion due to the phase transition should be eliminated and as a result the formation of cracks should be avoided.

Figure 4:
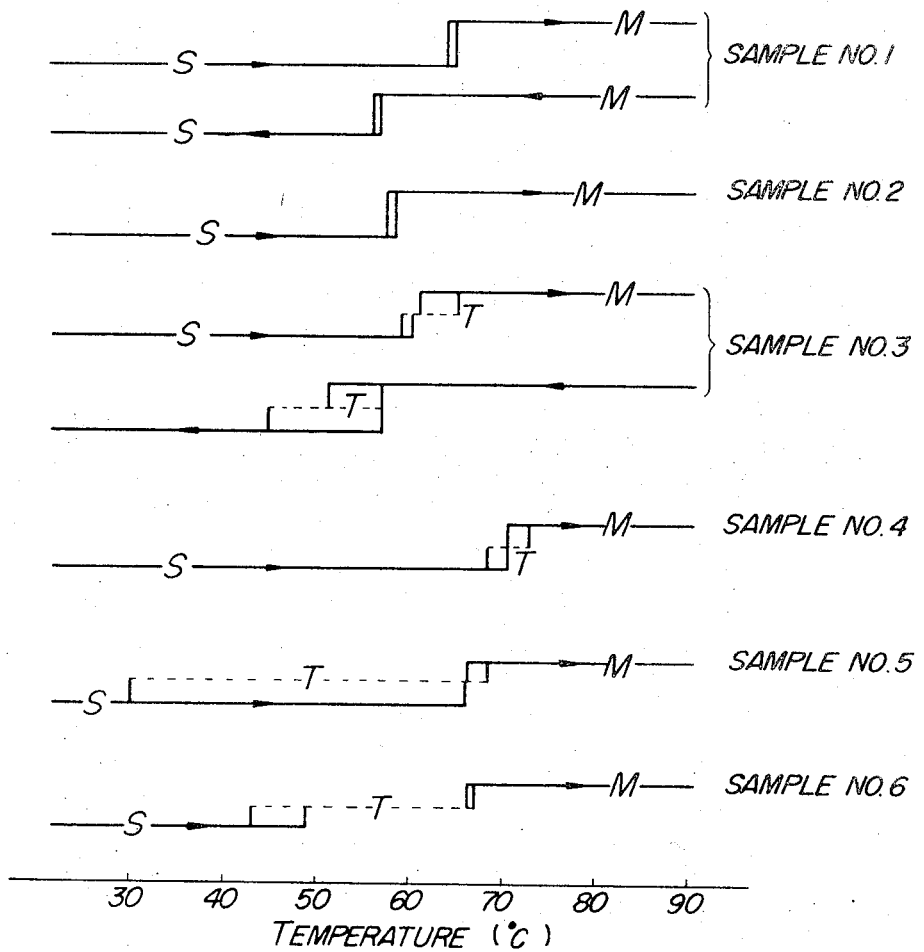
FIG. 4 shows a schematic diagram for illustrating influences of temperature upon phase transition taking place in the devices, wherein 6 kinds of C.T.R. devices are shown.

The present inventors studied the first condition, that is, the C.T.R. device consisting of substances almost incapable of forming the intermediate phase, and as a result of studying the state of the intermediate phase formation of the respective samples in said Table 1, it was found that such intermediate phase did not form in every sample but the formation of such intermediate phase deepnds upon the samples themselves. Relations between the respective samples and the intermediate phase are given in FIG. 4, wherein the intermediate phase is shown by the dotted line. Further, it was found that a temperature range (T) for the presence of intermediate phase was in correlation with the impurities contained in the respective samples. That is, samples having a wide temperature range for the presence of intermediate phase were those containing such elements readily capable of being converted to trivalent elements within the crystals as Al, Cr, Fe, or the like, for example, Samples Nos. 5, 6 and 3.

Those containing such a tetravalent element as Ge, etc., for example, Sample No. 4, had a very narrow temperature range. In those containing such a pentavalent element or element having higher valency, as Nb, etc., for example, Sample No. 2, no intermediate phase was formed. Further, it was found that the intermediate phase tended to be formed when the atmosphere had an increased degree of reduction at the sintering.

As stated above, the reason why the occurence of the intermediate phase depends upon the impurities contained in the $VO_2$ monocrystals and the degree of reduction of the atmosphere at the sintering is that an uneven distribution of the so-called magnegli defect is formed in the $VO_2$ crystals by the relation between the valence of impurities involved in $VO_2$ and partial pressure of oxygen around the crystals, the $VO_2$ crystals are locally converted to $VO_{2-x}$ ($x$ is in a relation of $0<x<1$), and the development of the intermediate phase is induced, but the magnitude of such defect is governed by said conditions.

Further, it must be pointed out that when the crystals consist of pure $VO_2$, such intermediate phase is not formed, and in such a case the temperature-resistance curve shows a characteristic of very suddenly-changing resistance. The temperature-resistance curve suddenly changes its direction almost at a right angle. The temperature range for completion of phase transition, that is, formation of electric conductor is very narrow and the change in resistance is great. It goes without saying that such characteristics are particularly desirable for the C.T.R. device as a switching element.

It is clarified in the foregoing that prevention of the development of intermediate phase and elimination of various unfavorable influences by the presence of intermediate phase are one of effective measures for obtaining a better C.T.R. device. Thus, it is derived from the foregoing facts that it is better to make a substance hardly capable of forming an intermediate phase be involved in the $VO_2$ crystals as an impurity or prevent contamination in the $VO_2$ crystals of a substance capable of readily forming an intermediate phase. To satisfy these conditions, it has been made clear from the foregoing results of the experiment to prevent the contamination of impurities from the $VO_2$ crystals or just to make only a tetravalent substance or a substance having a higher valency, such as Ge, Nb, or the like, be involved in the $VO_2$ crystals.

An effective method for preparing a more preferable C.T.R. device has been also derived, where, as stated above, the influence of cracks is made negligible. In such a method, conversion of $VO_2$ crystals into fine crystals is taken into account as a means for making neglible the influence of cracks. That is, the $VO_2$ crystals are made into fine particles to such a degree that the distortion due to the phase transition may not bring about cracks. In the present invention, a C.T.R. device is prepared by agglomerating a large number of such fine particles, whereby such a disadvantage as a speed of transition is changed by disintegration of crystals due to said development of cracks can be eliminated and at the same time a uniformity in the speed of transition can be attained.

Referring to the examples, the present invention is explained hereunder in detail:

EXAMPLE 1

The Sample No. 1 of $VO_2$ monocrystal containing no impurities which is fabricated by the method as shown in the foregoing Table 1 is finely pulverized in an agate mortar, and $VO_2$ fine crystalline powder, or particles, arranged in a range not exceeding $50\mu$, is obtained using $50\mu$ sieve. The powder is placed into a jig, pressed by a press and shaped into a disc form. Then, electrode lead wires are brazed to the disc, whereby a C.T.R. device is obtained. The C.T.R. device thus prepared is embedded into resin in the same manner as in the above-mentioned experiment, and subjected to heating and successive cooling, and the transition phenomena are observed. As a result, the development of cracks due to the distortion at said transition is not observed in the C.T.R. device. The resistance-temperature characteristic of said C.T.R. device consisting of fine $VO_2$ particles having sizes not exceeding $50\mu$ shows a sudden change in the resistance at a specific temperature as shown in FIG. 5, and further shows very desirable hysteresis as small as about 0.1 to 0.2° C.

EXAMPLE 2

The fine $VO_2$ crystal powders having sizes not exceeding $50\mu$ which were prepared in the same manner as in Example 1 were mixed with an oxide of SrO, $Co_2O_3$, $GeO_2$, BaO, CaO, PbO, $Nb_2O_5$, $Al_2O_3$ or $Fe_2O_3$ or a mixture thereof in an agate mortar. Then, the mixture was sintered at 1000° C. in $N_2$ gas respectively and thereby C.T.R. devices were obtained.

The temperature-resistance characteristics of these C.T.R. devices were determined, and it was found that the C.T.R. device consisting of fine $VO_2$ crystals of $50\mu$ and under as a principal constituent showed a characteristic of very small hysteresis similar to that of the C.T.R. device consisting only of fine $VO_2$ crystals, as shown in FIG. 5.

However, it was found that in the C.T.R. device containing $Al_2O_3$ or $Fe_2O_3$, the intermediate phases were developed and had larger hysteresis phenomena than other C.T.R. devices containing the other oxide.

Particularly, in the C.T.R. devices consisting of fine $VO_2$ crystals as a principal constituent, whose particle sizes were arranged to be $50\mu$ and under, and containing an oxide of germanium, strontium or niobium, development of the intermediate phase was rarely observed, and consequently the much improved hysteresis phenomenon, namely 0.2 to 0.5° C., was observed.

As a result of detailed observation of change in phase-transition of each sample prepared in the present example due to change in temperature, no cracks due to the distortion at the phase transition were observed in the C.T.R. devices consisting of the fine $VO_2$ crystals of 50 microns and under and containing other oxide. Furthermore, it was remarkable to note that by mixing other oxide into the $VO_2$ crystals, the distortion brought about at the phase transition was absorbed by said other oxide, and the oxide acted as a buffer substance and a thermo conductive material.

EXAMPLE 3

Fine $VO_2$ crystal particles not exceeding $50\mu$ were mixed with at least one kind of other oxides in the same manner as in Example 2, and kneaded using water as a binder. Fine palladium wires were used as electrode lead wires, and two palladium wires were intensely stretched at a 2 mm.-wide distance, and the kneaded mixture consisting of $VO_2$ and other oxides was fixed in a granular form to the stretched palladium wires using a small bar.

According to the same method as that for preparing the ordinary bead-type thermister, the granular mixture was shaped into a bead form and sintered in a $N_2$ gas at 1000° C. for 2 to 3 minutes, whereby C.T.R. devices were obtained.

Also in such C.T.R. devices, similar determination and observation as in the preceding examples were conducted and quite a similar result was obtained as in the preceding two examples. That is, it was confirmed that even in the C.T.R. devices consisting of fine $VO_2$ crystals, whose particle sizes were arranged to be $50\mu$ and under, as a principal constituent, even though other oxide should be involved, the hysteresis was in a range of 0.1 to 0.5° C.

As explained with reference to the examples, the present invention is characterized by a C.T.R. device prepared by finely pulverizing $VO_2$ monocrystals so that the particle sizes may be $50\mu$ or under, compressing and shaping the thus finely pulverized crystal powders into a desired form such as a disc form or kneading the powders using a binder and shaping the same into a bead form or other sheet or rod form, or other desired form, and sintering the same or a C.T.R. device prepared by mixing said fine $VO_2$ powders with other oxide fine powders, and shaping and sintering the same in the same manner as mentioned above.

In the C.T.R. device prepared by shaping finely pulverized $VO_2$ crystals or a mixture thereof with other oxide, and shaping and sintering the same, the following effects can be attained in addition to the improved hysteresis phenomenon as described above.

That is to say, as a result of making negligible the influence of distortion due to said pulverization as well as the pulverization itself, the phase transition takes place uniformly at the same time at every part, and consequently, the distribution of the transition temperature becomes narrow; the speed of transition becomes high; the specific temperature is concentrated, the temperature range from the occurence of change in the resistance to the completion of change becomes very narrow and the change in the resistance becomes acute. Accordingly, a C.T.R. device having a very good temperature-resistance characteristic, as shown in FIG. 5, can be obtained.

Further, dissipation of heat generated in the C.T.R. device can be effectively attained by the pulverization and thus it is well understandable that a very good characteristic can be obtained thereby.

Further, in the case where the fine $VO_2$ crystals are mixed with other oxide and sintered, an oxide of trivalent or divalent element can be used in so far as the ion diameter of such element is larger than the ion diameter of vanadium ion. The oxide of such element never dissolves or immigate into vanadium oxide, and thus never forms said intermediate phase and consequently never brings about any deterioration of the characteristics.

Thus, among the oxides of trivalent or divalent elements, there are useful oxides capable of being mixed with the $VO_2$ crystals. It is clear from the foregoing explanation that such oxides must contain an element having a larger ion radius than the vanadium ion radius of 0.61 A. As elements satisfying said condition, barium, strontium, etc. can be mentioned. Actually, a C.T.R. device was obtained by mixing the fine $VO_2$ crystals with the oxide of such element that satisfied said condition, and sintering the same. As to the strontium, a good result was actually obtained as explained above.

In the sintering, it goes without saying that a C.T.R. device can be likewise obtained by compressing the $VO_2$ mixture by a press into a disc form or shaping the $VO_2$ mixture into any desired form such as a bead form, etc. using a binder, for example, water and sintering the same.

As stated above, the features of the present invention are summarized as follows:

(1) When the phase transition is repeated several times, distortions due to the transformation of crystals are brought about at every phase transition, and such distortions are the greatest cause for impairing the reproducibility of the phase transition. In preventing the occurence of such distortions, a best effect can be obtained by using fine $VO_2$ crystals having particle sizes of 50 microns and under.

(2) A good C.T.R. device can be prepared by sintering the fine $VO_2$ crystal powders themselves or mixing the $VO_2$ crystal powders pulverized in advance with other oxide, shaping the same into any desired form, and then sintering the same.

(3) The distribution of transition temperature is concentrated to a specific temperature by pulverizing the $VO_2$ crystals to make better the electric characteristic, stabilize the characteristic and improve heat dissipation.

What we claim is:

1. In a critical temperature resistor device comprising a body including vanadium oxide crystalline particles, the fundamental unit structure of the vanadium oxide being expressed by a chemical formula $VO_2$, the improvement comprising that substantially all of said vanadium oxide crystalline particles included in the body have particle sizes of $50\mu$ and under.

2. In a critical temperature resistor comprising a body including vanadium oxide crystalline particles, the fundamental unit structure of the vanadium oxide being expressed by a chemical formula $VO_2$, the improvement comprising that substantially all of said particles are arranged in a range not exceeding $50\mu$, and that said body contains at least one oxide selected from the group consisting of SrO, $Co_2O_3$, $GeO_2$, BaO, CaO, PbO, $Nb_2O_5$, $Al_2O_3$, $Cr_2O_3$ and $Fe_2O_3$.

3. A method for preparing a critical temperature resistor device, comprising the steps of pulverizing $VO_2$ crystals, screening the pulverized crystals to obtain fine crystalline particles in a range of $50\mu$ and under, mixing the screened crystalline particles with at least one powdery metal oxide selected from the group consisting of SrO, $Co_2O_3$, $GeO_2$, BaO, CaO, PbO, $NbO_5$, $Al_2O_3$, $Cr_2O_3$ and $Fe_2O_3$ and sintering the resulting mixture.

4. In a thermal sensitive device comprising a body including fine crystalline particles of vanadium oxide the fundamental unit structure of which is expressed by a chemical formula $VO_2$, and a plurality of electrodes connected to said body, the improvement wherein the sizes of substantially all of said crystalline particles in said body are arranged in a range not more than 50 microns.

5. The device according to claim 4, in which said body further includes an oxide of an element selected from the group consisting of strontium, cobalt, germanium, barium, calcium, lead, niobium, aluminum, chromium and ion.

6. The device according to claim 4, in which said body further includes an oxide of a metallic element the ion diameter of which is larger than that of vanadium ion.

7. The device according to claim 6, in which said metallic element is selected from the group consisting of strontium, cobalt, germanium, barium, calcium, lead and niobium.

8. A method for preparing a thermal sensitive device comprising the steps of pulverizing $VO_2$ crystals, screening the pulverized crystalline particles to remove pulverized particles of $VO_2$ crystals the size of which is more than 50 microns from the pulverized crystalline particles, and forming the screened particles of $VO_2$ crystals the sizes of which are not more than 50 microns into a desired shape.

9. A method for preparing a thermal sensitive device comprising the steps of pulverizing $VO_2$ crystals, screening the pulverized crystalline particles to remove the pulverized particles of $VO_2$ crystals the sizes of which are more than 50 microns from the pulverized crystalline particles, mixing the screened crystalline particles the sizes of which are not more than 50 microns with an oxide of an element selected from the group consisting of strontium, cobalt, germanium, barium, calcium, lead, niobium, aluminum, chromium and ion, and sintering the resulting mixture.

References Cited

UNITED STATES PATENTS 3,402,131   9/1968   Futaki et al. _____ 252—518

DOUGLAS J. DRUMMOND, Primary Examiner

U.S. Cl. X.R.

23—140